United States Patent
Takeuchi et al.

[19]

[11] Patent Number: 5,923,429
[45] Date of Patent: Jul. 13, 1999

[54] APPARATUS FOR MONITORING IN-SITU THE THICKNESS OF A FILM DURING FILM DEPOSITION AND A METHOD THEREOF

[75] Inventors: Masayuki Takeuchi; Shinya Nakagawa, both of Shiga-ken, Japan

[73] Assignee: International Business Machines Corporation, Armonk, N.Y.

[21] Appl. No.: 09/172,698

[22] Filed: Oct. 14, 1998

[30] Foreign Application Priority Data

Mar. 5, 1998 [JP] Japan .................................. 10-053623

[51] Int. Cl.⁶ ........................... G01B 11/06; G01B 11/02; G01B 9/02
[52] U.S. Cl. ........................... 356/382; 356/381; 356/355; 356/353; 356/357
[58] Field of Search ..................................... 356/381, 382, 356/355, 353, 357

[56] References Cited

U.S. PATENT DOCUMENTS

| | | | |
|---|---|---|---|
| 5,717,490 | 2/1998 | Kumar | 356/381 |
| 5,724,145 | 3/1998 | Kondo et al. | 356/382 |

FOREIGN PATENT DOCUMENTS 62-173711 of 1966 Japan.

*Primary Examiner*—Frank G. Font
*Assistant Examiner*—Roy M. Punnoose
*Attorney, Agent, or Firm*—H. Daniel Schnurmann

[57] ABSTRACT

A film deposition apparatus and a method thereof for accurately forming a film of a given thickness on the surface of a wafer is described. The film deposition apparatus includes a laser beam to perform a precise in-situ monitoring of a change in thickness of the film being deposited on the surface of the wafer. An optical guide is provided in an attachment coupled to the quartz furnace of a chemical vapor deposition apparatus. A laser beam is introduced into the quartz furnace through the optical guide, and is projected onto the wafer. The laser beam reflected by the wafer is channeled through the same optical guide to be discharged to the outside of the quartz furnace. A change in thickness of the film is monitored based on the strength of the reflected laser beam. In this manner, the laser beam can be transmitted without passing through the wall of the quartz furnace, and the thickness of the film can be accurately monitored without the process being affected by the thin film deposited on the internal wall of the quartz furnace.

18 Claims, 5 Drawing Sheets

APPARATUS FOR MONITORING IN-SITU THE THICKNESS OF A FILM DURING FILM DEPOSITION AND A METHOD THEREOF

FIELD OF THE INVENTION

The present invention relates generally to a method and an apparatus for monitoring changes in thickness of a film while it is formed on the surface of a substrate. More specifically, it relates to a method and apparatus for controlling the thickness of the film using LPCVD (low pressure chemical vapor deposition) while manufacturing a semiconductor device.

BACKGROUND OF THE INVENTION

The deposition of thin film on the surface of a semiconductor wafer is a required step in the manufacture of a semiconductor device. Since the thickness of the thin film greatly effects the characteristics of the semiconductor device, this thickness must be precisely controlled.

The conventional method for regulating the thickness of a film is typically performed following the completion of the deposition of the film by CVD. A dedicated wafer for monitoring the thickness is taken from the apparatus and its film thickness is measured by a second measurement tool. The deposition rate is then calculated as a function of the film thickness and the time spent on the deposition. Based on this calculated rate, the deposition time of the next batch (i.e., the next film) is adjusted to form a film on the surface of the wafer having the calculated thickness. This is referred to as a post-performance method. In order to alter the thickness of the film, a monitor wafer in each batch is employed when using LPCVD. Upon completion of the formation of the film in batch processing, the thickness of the film on the monitor wafer is examined to compare its thickness to the predetermined value. The difference in thicknesses obtained from a preceding process is feedback to adjust the deposition rate for a succeeding batch. Since this approach is a post-performance film thickness adjustment method, changes in film thickness on product wafers will be significant as the film thickness varies greatly from batch to batch. Clearly, this method is inaccurate and time consuming.

In a second film formation control method, a change or increase in thickness of a film is monitored in-situ during batch film deposition. To monitor the thickness of the deposited film using CVD, an externally introduced laser beam is projected through a quartz furnace to the surface of a monitor wafer. Variations in strength of the reflected light is used to determine changes in thickness of the film. In Japanese Unexamined Patent Publication No. Sho 62-173711, a CVD step is described during an optical process, wherein a thin film is laid on the surface of the substrate. With this method, the thickness of the film is monitored using the laser beam. The laser beam originating outside the reaction furnace is channelled through a light transparent port and is projected onto the surface of material inside the furnace. The laser beam reflected by the substrate passes through the port and is collected outside the furnace. In the cited reference, however, no consideration is given to the problem related to the effect produced by the film that is attached to the port due to the presence of the incident and reflected laser beams traversing the port. This method is referred to as epochal film thickness control method.

Standard CVD apparatus using a heater surrounding the quartz furnace defines a region in which gas reacts such that inside the region, a portion is formed which satisfies the condition for film deposition of providing the necessary temperature for decomposition of the reactive gas. At this time, the internal wall of the quartz furnace satisfies the conditions for film deposition and a film is deposited thereon. This deposited film absorbs, reflects, or interrupts the laser beam. As a result, it is difficult for a change in thickness of a film on the surface of the wafer to be precisely detected by changing the intensity of the reflected laser beam. To resolve this shortcoming, each time the film formation process is completed, a cleaning gas is introduced into the quartz furnace to remove film deposited inside the furnace. In this case, as the operating rate for the CVD apparatus is reduced, it results in an increased manufacturing cost. Thus, this method is not deemed to be practical. Furthermore, when a wafer is irradiated with a laser beam while the film is being deposited inside the quartz furnace, the laser beam must pass through a region wherein no film is deposited, a clear added drawback.

OBJECTS OF THE INVENTION

Accordingly, it is an object of the present invention to provide a method and apparatus that makes it possible to perform in-situ monitoring of the thickness of a film while it is being deposited on the surface of a substrate, without affecting the film being deposited.

It is another object of the present invention to provide a film deposition apparatus which uses a laser beam to perform precise in-situ monitoring of changes in the thickness of a film during a film formation process that uses chemical vapor deposition, and that is not affected by film deposited on the internal walls of a quartz furnace.

It is still another object of the invention to enhance the process of forming a film deposition which can be fully automated.

It is yet another object of the invention to increase productivity and enhance yield while forming a thin film on the surface of a wafer.

SUMMARY OF THE INVENTION

In one aspect of the invention, there is provided a film deposition apparatus and a method thereof for accurately forming a film having a predetermined thickness on the surface of a substrate.

In another aspect of the present invention, there is provided a film deposition apparatus for depositing a thin film on the surface of a substrate; an optical guide having a region inside a reaction furnace in which certain film deposition conditions are not satisfied, wherein travelling along the optical guide is a reflected laser beam that precisely portrays any change in thickness of the film occurring on the surface of the substrate.

To achieve these and other objects, according to the present invention, there is provided a film deposition apparatus that includes: a furnace for defining an inner space that includes a first region in which a film deposition condition is satisfied and a second region in which the film deposition condition is not satisfied; means for supporting a substrate in the first region of the inner space of the furnace; means for optically guiding a laser beam introduced in the second region to irradiate a surface of the substrate along which the laser beam reflected by the substrate travels to the second region; and means for optically generating a laser beam projected along the optical guide means and for receiving the reflected laser beam travelling along the optical guide means to determine the strength of the reflected laser beam wherein, based on the strength of the reflected laser beam, a change in thickness of the film is monitored while the film is being deposited on the surface of the substrate.

DETAILED DESCRIPTION OF A PREFERRED EMBODIMENT OF THE INVENTION

Figure 1:
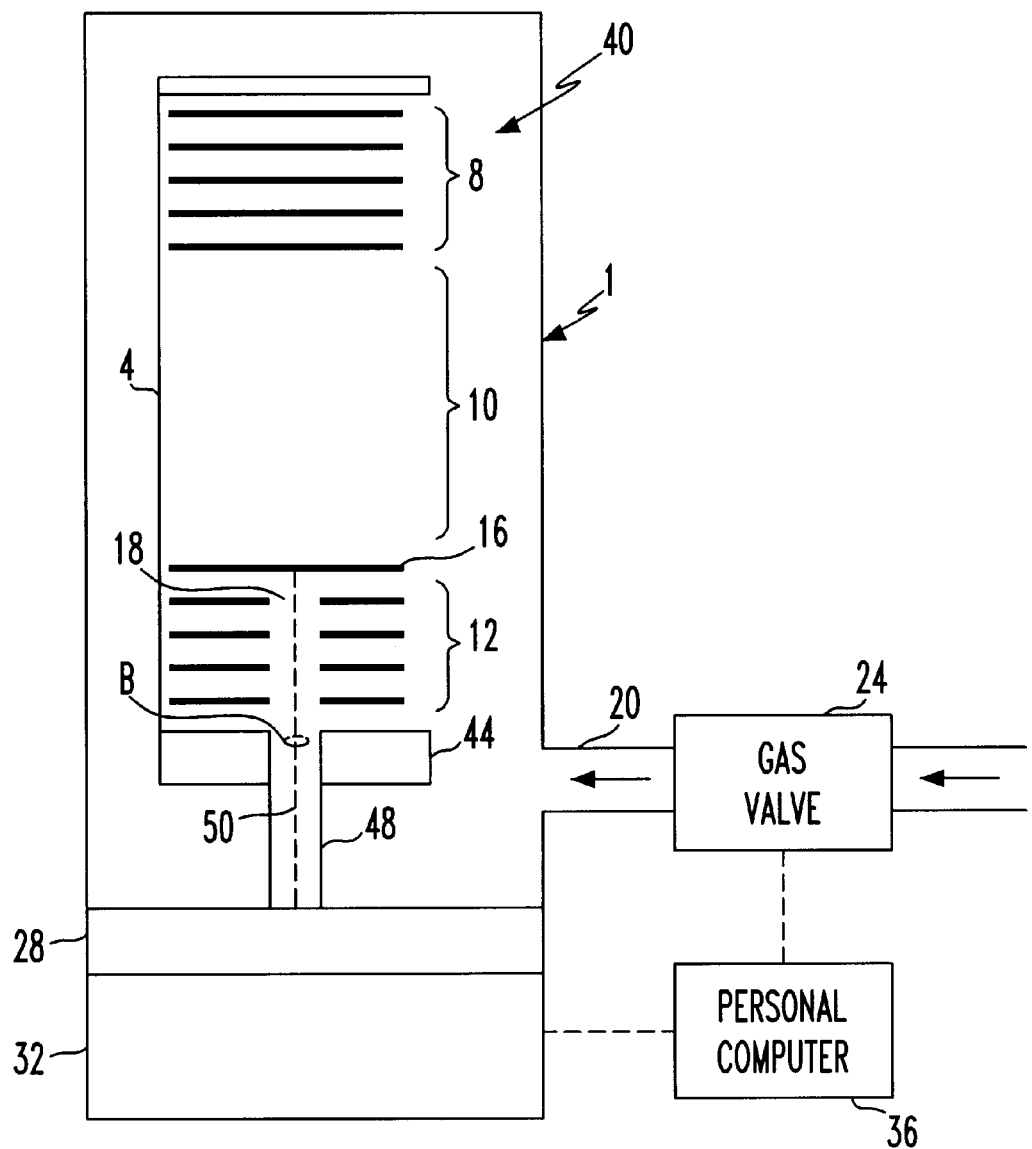
FIG. 1 is a diagram illustrating a film deposition apparatus which measures a change in thickness of a film while the film is being formed on the surface of a substrate, according to the present invention.

Referring now to FIG. 1, there is shown a diagram of an LPCVD (low-pressure CVD) apparatus according to the present invention that monitors changes in thickness of a film formed on the surface of a substrate of a semiconductor wafer. In this embodiment, a polycrystalline Si film is deposited on the wafer. The LPCVD apparatus has a well known structure consisting of: a quartz furnace 1 for defining a gas reaction region; a quartz boat 4 on which wafers 8, 10, 12 and 16 are mounted; a cap 28 for separating an inner space 40 of the quartz furnace 1 from the exterior; a gas introduction pipe 20; and a gas valve 24 for starting and halting the introduction of the gas. Further, for the LPCVD apparatus of the present invention, a box 32 is provided outside the quartz furnace 1, to be described hereinafter in more detail with reference to FIG. 4, which includes a conventional boat driver for generating a rotational force to rotate boat 4 and an optical unit for generating and controlling a laser beam 50 that monitors the thickness of a deposited film.

Figure 2:
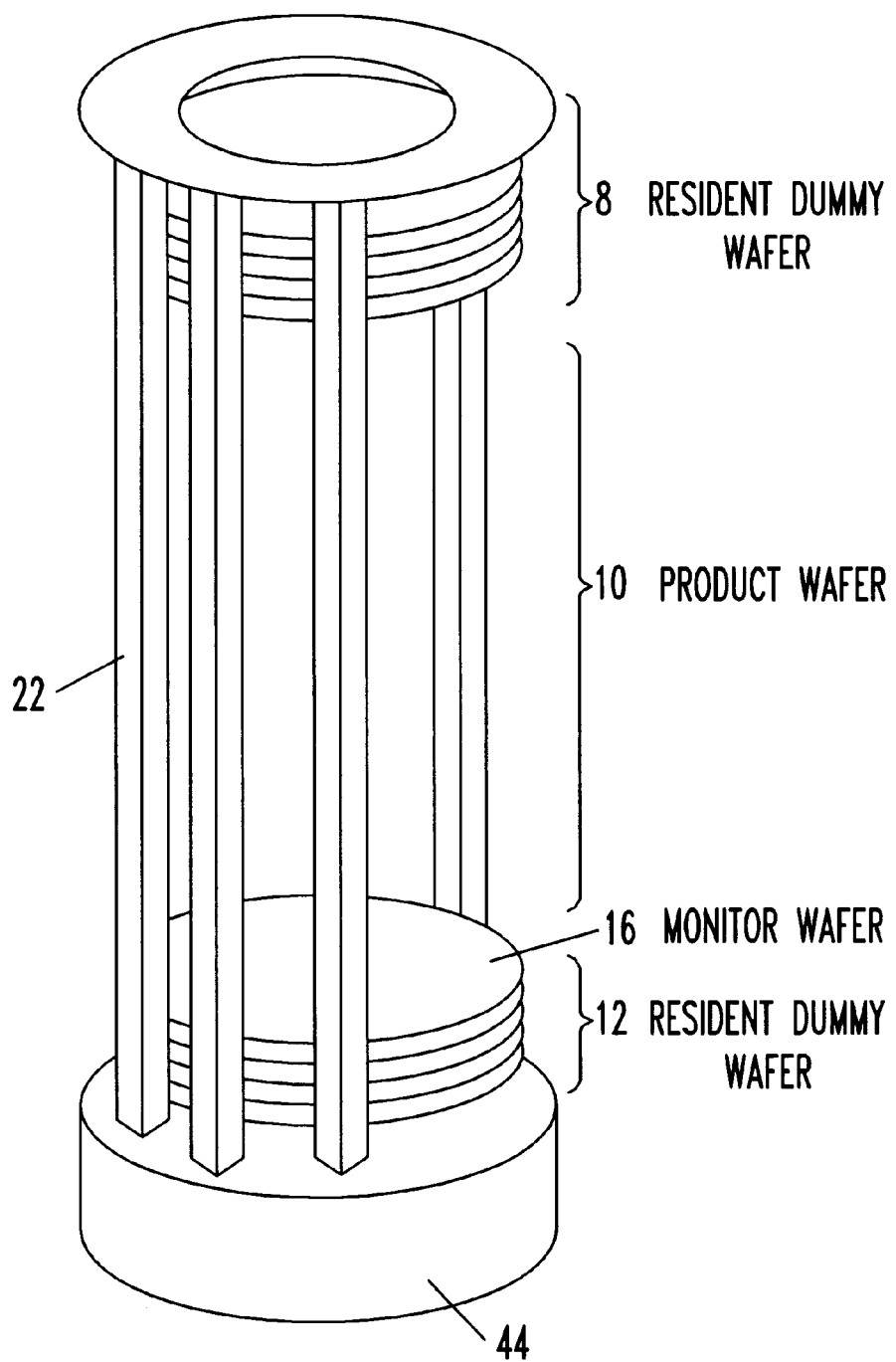
FIG. 2 is a diagram showing an arrangement of a plurality of dummy, product and monitor wafers mounted on a boat.

Referring now to FIG. 2, the quartz boat 4 consists of four quartz pillars 22, in which slits are formed at constant intervals for mounting multiple wafers 8, 10, 12 and 16, and a boat turntable 44. A rotational force is transmitted from the boat driver to the quartz boat 4 by way of a rotary shaft 48 (FIG. 4) connected to turntable 44 to twirl quartz boat 4. As the quartz boat 4 rotates, a film is deposited uniformly on wafers 8, 10, 12 and 16. The cap 28 seals the opening in the quartz furnace 1 in order to prevent gas from escaping from the inner space 40 of the quartz furnace to the outside. Since the lower opening in the quartz furnace 1 is sealed, the inner space 40 of the furnace can be evacuated to obtain low pressure conditions in the quartz furnace. Through the well known film deposition process, a reaction gas is introduced through gas valve 24 along gas pipe 20 leading to the inner space of the quartz furnace.

A heater coil (not shown) is wound around the external surface of the quartz furnace 1. Normally, a plurality of coils that are, preferably, independently controlled are located in the longitudinal direction of the furnace and are adjusted to form a region in the inner space 40, wherein conditions necessary for film deposition are satisfied. In the actual process, a pressure of 200 mTorr (1 atmosphere=760 Torr, 1 Torr=133 Pa) is employed. Since, under this pressure a polycrystalline Si film having a uniform thickness is grown on the surface of the wafer using monosilane ($SiH_4$) as the reactive gas, film deposition at a temperature of 600° to 700° C. can be provided.

Preferably, dummy wafers are stacked at the upper and lower sections of the boat 4, reserving the intermediate space for product wafers. The product wafer 10 nearest to the rotary shaft 48 is used as the monitor wafer 16 for monitoring the thickness of the film. It should be noted that the monitor wafer 16 may be a product wafer or it may be used solely for thickness overseeing. The inner space 40 surrounds upper dummy wafers 8, product wafers 10, monitor wafer 16 and lower dummy wafers 12, all of which are mounted along the wafer support portion of the quartz boat 4. The wafers are placed at positions where the heater coils are adjusted to satisfy the necessary conditions for film deposition. As indicated by the schematic diagram of boat 4, approximately one hundred wafers 10 representing actual products wafers are arranged at constant intervals between the upper dummy wafers 8 and the lower dummy wafers 12. The upper and lower dummy wafers 8 and 12 are placed in the quartz boat 4 because as it were not for the dummy wafers, the thicknesses of the film deposited on the product wafers would vary in an unacceptable manner to achieve uniformity of deposition. Ordinarily, because of the presence of dummy wafers 8 and 12, ideal deposition conditions for a substantially uniform thickness film deposition are provided at the positions occupied by the product wafers 10. Therefore, a high quality thin film is deposited on the approximately one hundred product wafers 10.

Frequently, during the actual film formation, a monitor wafer 16 that is not part of the set of product wafers 10 is incorporated in this stack, although product wafers can be used for this purpose. In the latter case, the product wafer 10 that is to be irradiated by laser beam 50 should not have a complicated pattern and should not be a multi-layer structure. This is because when a wafer has a complicated pattern or a multi-layer structure (three or more layers) it is difficult to accurately monitor the thickness of the film.

In addition to the regions occupied by wafers 10 and 16 that are carried by the boat 4, the heater of the quartz furnace 1 (not shown) provides regions in the inner space 40 for which acceptable conditions for film deposition are satisfied. By way of example, during film formation, the film is attached to the internal wall of the quartz furnace 1 near the heater. Since the upper portion B of rotary shaft 48 and cap 28 are located in a region in which a temperature of 600° C. inhibits a chemical reaction by the monosilane ($SiH_4$) reaction gas, no film is deposited at these locations.

When the laser beam for monitoring the film formation is emitted from the region in which no film has been deposited, interference between the reflection and absorption of the laser beam by extra film being deposited can be prevented. If the laser beam reflected by wafer 16 travels through the region where no film is present, a change in thickness of the film on wafers 16 can be precisely monitored using the reflected laser beam. Normally, the individual coils that form the heater are adjusted so that all the product wafers are maintained at a required temperature during the deposition of the film. On the other hand, the temperature in the furnace decreases toward the end of the dummy wafers 12. Therefore, the temperature at the cap 28, the boat turntable 44 and the upper portion B of the rotary shaft 48 are not adequate for decomposing the reactive gas, i.e., below 600 to 700° C., and no deposited film takes place in those areas.

Let it be assumed that the inside of the rotary shaft 48 is hollow and that laser beam 50 is externally generated and is introduced into the inner space in the quartz furnace 1 through the hollow portion of the shaft acting as an optical guide. After passing through the optical guide and reaching the upper end B of the rotary shaft 48, the laser beam 50 is projected onto and reflected by the monitor wafer 16. The reflected laser beam 50, which is representative of a change in thickness of the film deposited to the wafer, is channelled through the previously mentioned optical guide to the outside of the quartz furnace 1 and is received by optical unit 32. The reflected laser beam 50 is not affected by the interference produced by the film other than that deposited on the monitor wafer 16. Along the optical path, an opening 18 having, preferably, a 5 mm diameter which is formed in the lower dummy wafers 12, extends from the upper end B of the hollow portion of the rotary shaft 48 to the monitor wafer 16, enabling direct irradiation of the monitor wafer 16 with the laser beam 50. As a result, the laser beam 50 emitted from the upper end B of the hollow portion of the rotary shaft 48, (which constitutes the optical guide) is projected onto the monitor wafer 16 without being adversely affected by the deposited film and by optical obstacles. When the laser beam 50 reflected by the wafer 16 is transmitted along the incident path in the reverse direction, the reflected laser beam 50 can be received by optical unit 32 without being affected by any excess film deposited or by optical obstacles in the quartz furnace 1.

Figure 3:
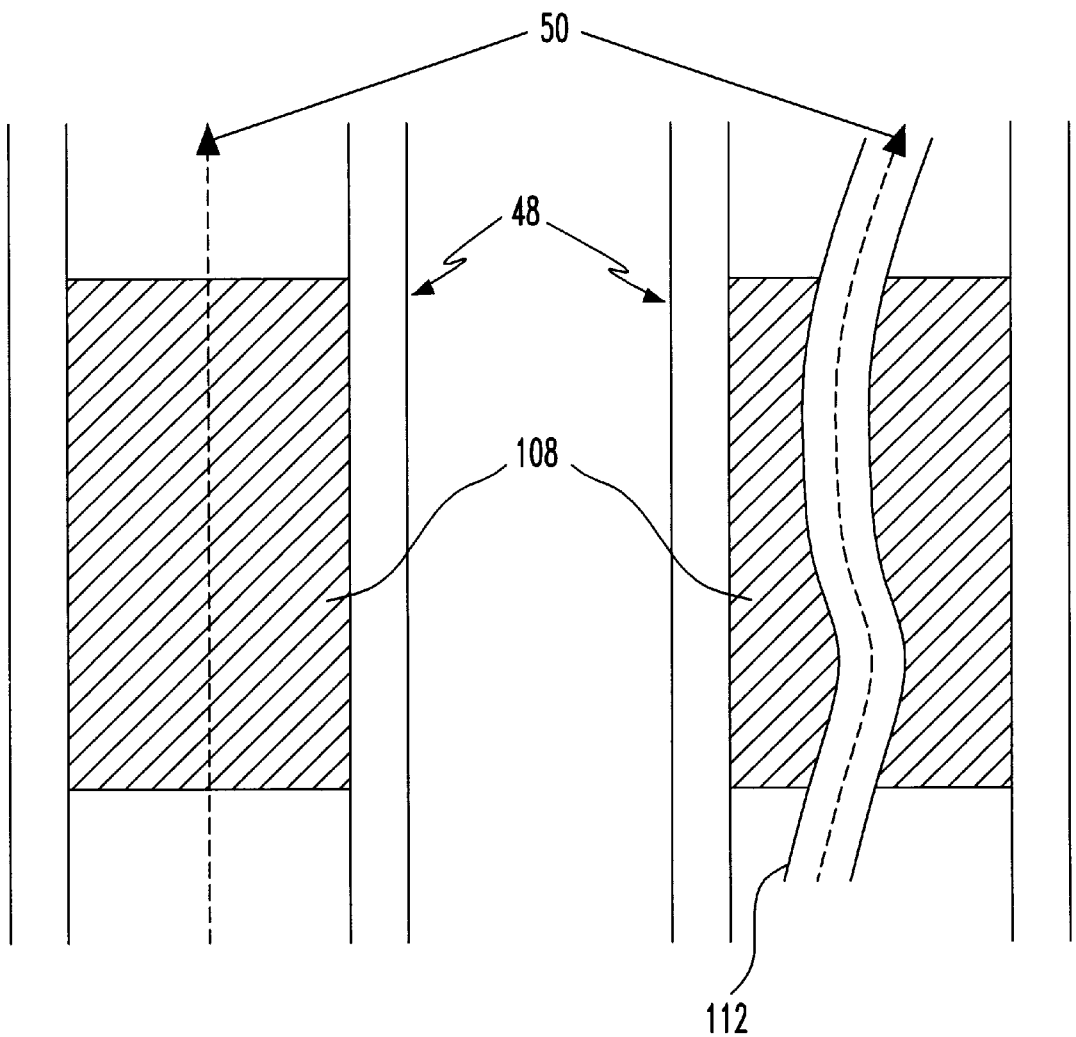
FIG. 3 is a diagram showing an example of the rotary shaft of the boat acting as an optical guide.

Referring now to FIG. 3, there is shown an instance wherein the rotary shaft 48 of boat 4 acts as an optical guide to direct externally produced laser beam 50 into the inner space 40 of the quartz furnace 1. In this example, as a first advantage, since the laser beam is channelled through the rotary shaft 48, interference produced by film deposited inside the quartz furnace 1 related to laser beam 50 can be avoided. As a second advantage, since the laser beam 50 is guided through the rotary shaft 48 to the inside of the quartz furnace 1, a film deposition apparatus having a simple structure can be provided.

On the left side of drawing of FIG. 3 there is shown an example wherein the rotary shaft 48 having a hollow portion acts as an optical guide through which the laser beam 50 passes. Part of the hollow portion of the rotary shaft 48 is filled with transparent quartz glass 108 through which a He-Ne laser beam having a wavelength of 6328 Å passes to prevent reactive gas from flowing out of the quartz furnace 1 and, further, such that the internal area of shaft 48 is shielded from the outer area to ensure that the deposition pressure is maintained. On the right side of the drawing in FIG. 3 there is shown an optical fiber 112 traversing the rotary shaft 48. The interior of the rotary shaft 48, except for the optical fiber 112, is filled with packing material, so that the interior of the shaft is shielded from the outside for the same reason as was described with reference to the left side of the drawing.

A detailed explanation of the principles involved will now be given with reference to FIG. 4.

The reflected laser beam is received by the optical unit via the optical guide without being affected by the film deposited. The strength of reflected light is detected and converted into a voltage. A computer 36 analyzes changes in thickness of the film and determines the deposition period based on changes occurring in the value of the voltage. When the computer 36 detects that a target thickness has been attained, the gas valve 24 shuts-off and the boat 4 is withdrawn from the quartz furnace 1. The film formation process terminated at this point.

Figure 4:
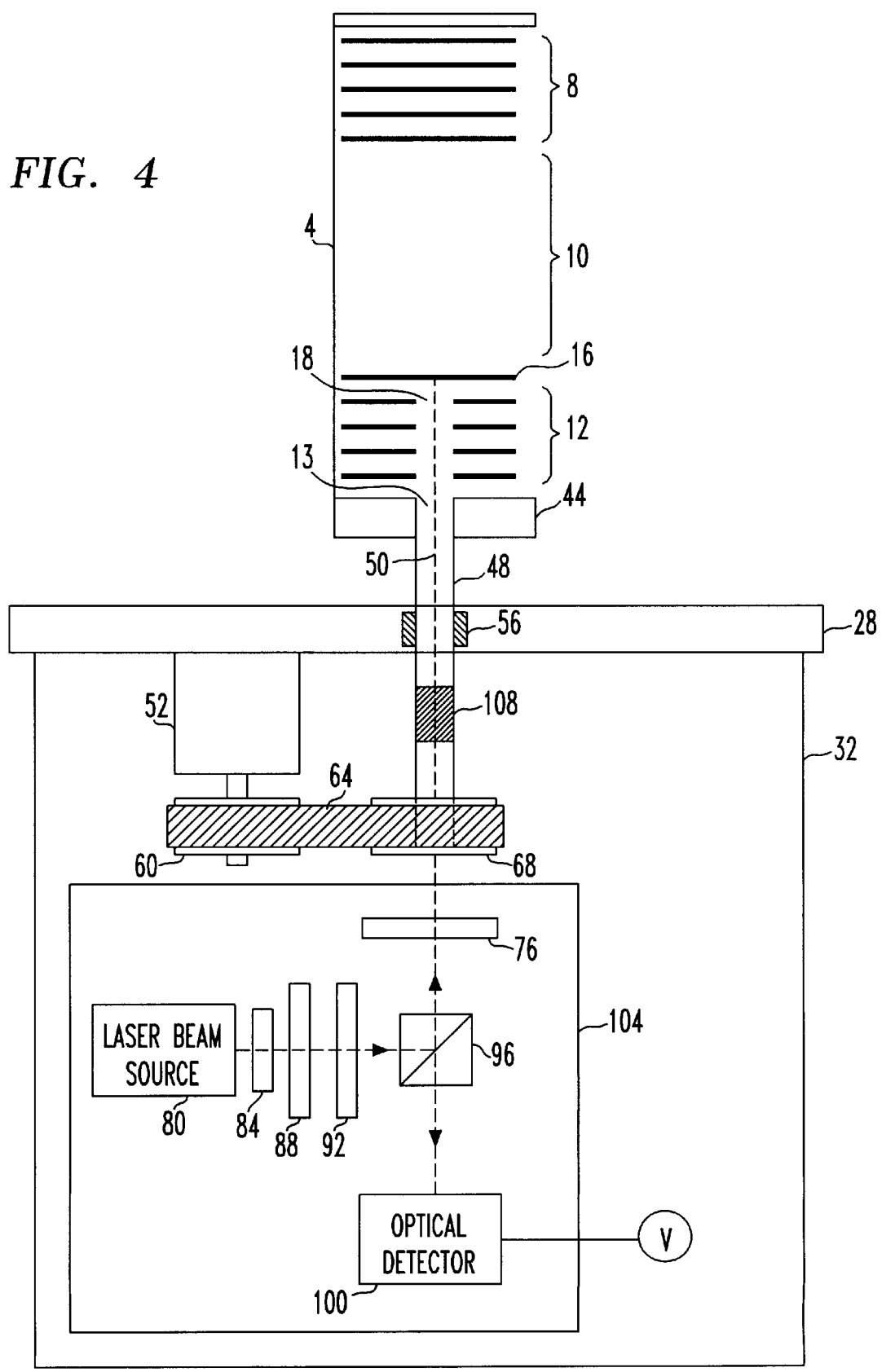
FIG. 4 is a detailed diagram showing the structure of a box integral to the film deposition apparatus of the present invention, that includes a boat drive mechanism and an optical unit.

FIG. 4 is a detailed diagram showing the structure of the box 32 in FIG. 1 that includes the boat drive mechanism and the optical unit. A He-Ne laser source 80 is typically prepared as inactive and the emission of the laser beam 50 is controlled by turning on an optical switch AOM (Acoustic Optical Modulator) 84. The laser beam 50 traverses a polarization plate 88 to shape a light polarization plane. Subsequently, the laser beam 50 passes through a half-wavelength plate 92 to form a beam that includes only an S polarized element. When the resultant laser beam 50 is transmitted to a polarized light beam splitter (PBS) 96, it is fully reflected and directed toward the hollow portion of the rotary shaft 48, acting as an optical guide. The incident laser beam 50 passes through the hollow portion of the rotary shaft 48 and then through cap 28 and boat turntable 44 to the upper end B of the optical guide. Following this, from the upper end B of the optical guide, the laser beam 50 irradiates the monitor wafer 16. At this point, the laser beam is transmitted through the openings formed in the centers of the lower dummy wafers 12 to reach the monitor wafer 16. As the thickness of the film changes, the intensity of the reflection of the laser beam 50 varies due to a well known multiplex light interference phenomenon occurring at the surface of wafer 16. Changes in reflection intensity occurring as a result of a fluctuation in the film thickness and of multiplexing interference phenomenon, will be described in detail hereinafter with reference to FIG. 5. Briefly, the reflected laser light is obtained by synthesizing light reflected from the surface of the wafer with light reflected by the film formed on the wafer, and because of the interference characteristic of the light, the strength of the reflected laser light changes in accordance with a difference in the optical paths. This change, correspondingly, indicates a change in the thickness of the film.

The reflected laser beam is transmitted in the reverse direction along the path followed by the incident light, entering the upper end B of the optical guide. The reflected laser beam 50 passing through the optical guide is transmitted through a quarter-wavelength plate 76, changing from S polarized light to P polarized light. The reflected laser beam 50 containing only P polarized light enters PBS 96; thereat, it is fully transmitted, finally reaching an optical detector, i.e., photomultiplier tube 100. The photomultiplier 100 converts the intensity (strength) of the reflected laser beam 50 into a voltage. Thereafter, a voltage signal is transmitted to the computer 36. The computer 36 performs an A/D conversion of the voltage signal, storing the resultant signal as digital data, in accordance with a predetermined sampling frequency. It, additionally, also analyzes the data.

Figure 5:
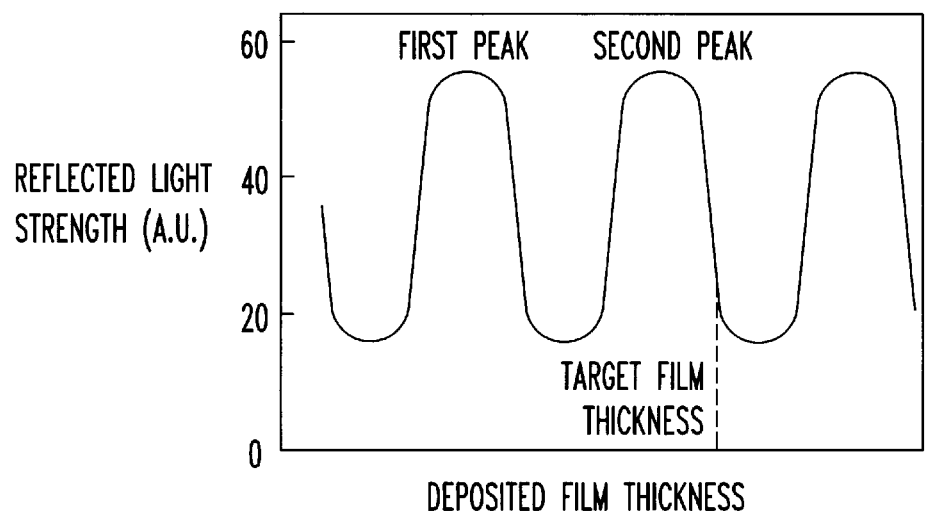
FIG. 5 is a graph showing a theoretical curve for the strength of a reflected laser beam which changes as a function of deposition time.

FIG. 5 is a theoretical curve showing the intensity (strength) of the reflected laser beam 50 relative to the thickness of the film which changes as a function of deposition time. It is found through calculation. When a multiplex interference of light is used, the curve corresponds to a vibrational curve. The monitoring using multiplex interference, which is well known in the art, will now be explained in more detail.

The reflected laser beam is obtained by synthesizing light reflected by the surface of a film formed on the surface of the monitor wafer 16 with light reflected at the boundary between the film and the wafer. The change in strength of the synthesized light is caused by a phenomenon based on the optical wavelength whereby the amount of interference varies by the difference in the optical paths of the two reflected light beams originated from the change in film thickness. The change in intensity of the synthesized light due to interference is represented by the vibration curve having a wavelength that corresponds to that of the He-Ne laser beam. Therefore, theoretically, the film thickness at a specific time can be detected from the vibration curve representing the strength of the reflected laser beam. In the invention, since it is easy to obtain the film thickness at each peak value of the vibration curve of the reflected laser beam, the actual target thickness of the film is detected using as a reference the time at which the intensity reaches each peak. Preferably, an He-Ne laser having a wavelength of 6328 Å is used. However, if a laser beam having a shorter wavelength is employed, a curve can be obtained that vibrates with a more pronounced level of sensitivity to changes in thickness of the film. That is, when the monitor wafer 16 is irradiated with a laser beam having a shorter wavelength, monitoring of the target thickness of a film can be performed precisely while the film formation process is in progress.

Figure 6:
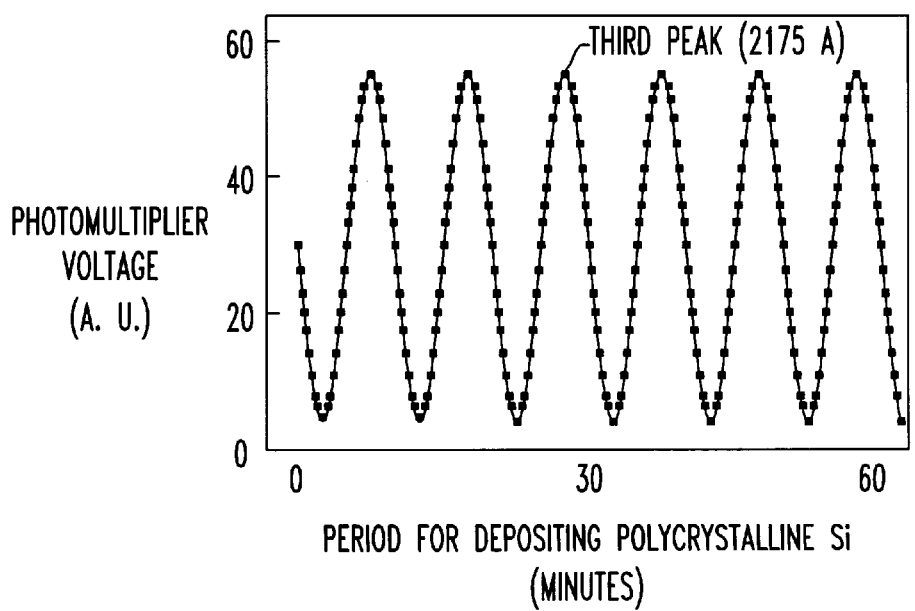
FIG. 6 is a graph showing a relationship between the reflected laser beam and the deposition period of time for the case wherein a polycrystalline Si film is deposited on the surface of an $SiO_2/Si$ substrate.

FIG. 6 is a plot showing the relationship between the film thickness and the deposition period for a polycrystalline Si film formed on the surface of an $SiO_2/Si$ substrate. A film deposition apparatus uniformly fills monosilane ($SiH_4$) in the quartz furnace 1 and forms a polycrystalline Si film on the surfaces of the wafers 8, 10, 12 and 16 stacked in boat 4. The laser beam must be reflected at the boundary between the Si substrate and the film in order to monitor the thickness of the polycrystalline Si film using light reflection. Therefore, an oxide film layer consisting of $SiO_2$ and having a thickness of 160 Å is formed as an intermediate layer on the surface of the wafer substrate. It should be noted that if a film is made of TEOS ($SiO_2$) or $Si_3N_4$, constant light reflection will occur at the boundary between the film and the Si substrate. Therefore, an intermediate $SiO_2$ layer is not always required.

Referring momentarily back to FIG. 4, while avoiding the deposited film, the He-Ne laser beam 50 having the wavelength of 6328 Å is introduced into the quartz furnace 1 through the hollow rotary shaft 48, which acts as an optical guide, and is projected onto the monitor wafer 16. The portion of the laser beam 50 reflected by the monitor waver 16 traverses the aforementioned optical guide without being affected by extra deposited film and exits to optical unit 104. The intensity of the reflected laser beam 50 is converted into a voltage signal by the photomultiplier 100. Its theoretical curve is shown in FIG. 5. However, the deposited film, the intermediate layer, and the Si substrate actually include an element that attenuates as well as transmits the light. Specifically, the reflective indexes of the Si substrate, $SiO_2$ and polycrystalline Si relative to the wavelength of 6328 Å are 3.88–0.02 i, 1.46–0 i, and 3.91–0.05 i (i representing an imaginary number). The imaginary number term relates to the attenuation of light. That is, as the thickness of the film increases and the deposition time elapses, the upper and lower peak photomultiplier voltage values, which represent the actual thickness of the polycrystalline Si film, are gradually reduced compared to the initial peak value of the vibration curve. In FIG. 6, values are provided by calculating the reduction in the peak values that occur when the film thickness increases, all the peak values being equal. If, with respect to the calculation of the amplitude (i.e., the axis of the photomultiplier voltage) of the vibration curve, arbitrary points along the curve including the peak points do not change along the axis for the deposition time, then, the exact change in the thickness of the film can be obtained from the vibration curve shown in FIG. 6.

According to the present invention, as there is no other factor other than the film on the surface of the monitor wafer 16 that produces a variation in strength of the reflected laser beam, an explicit vibration curve can be obtained. When the upper end B of the boat rotary shaft 48 that serves as an optical guide is positioned in the region in which conditions for film deposition are satisfied, when the monitor wafer 16 is irradiated with the laser beam 50 and the reflected laser beam 50 is received therefrom, a vibration curve of the type shown in FIG. 6 cannot be obtained.

While the invention has been particularly shown and described with reference to the preferred embodiment thereof, it will be understood by those skilled in the art that various changes in form and detail of the apparatus and method may be made therein without departing from the spirit and scope of the invention, and that the method is in no way restricted by the apparatus.

What is claimed is:

1. A film deposition apparatus comprising:
   a furnace for defining an inner space that includes a first region in which a film deposition condition is satisfied and a second region in which said film deposition condition is not satisfied;
   means for supporting a substrate in said first region of said inner space of said furnace;
   means for optically guiding a laser beam introduced in said second region to irradiate a surface of said substrate along which said laser beam reflected by said substrate travels to said second region; and
   optical generating means for generating said laser beam projected along said optical guide means and for receiving said reflected laser beam travelling along said optical guiding means for determining the strength of said reflected laser beam wherein, based on the strength of said reflected laser beam, a change in thickness of a film is observed while said film is deposited on said surface of said substrate.

2. The film deposition apparatus according to claim 1, wherein said furnace is a quartz furnace.

3. The film deposition apparatus according to claim 1, wherein said optical generating means includes an He-Ne laser beam source for generating said laser beam to be coupled to said optical guiding means, and a light detector for detecting the strength of said laser beam that is reflected.

4. A method for depositing a film that comprises a film deposition apparatus which includes a furnace for defining an inner space that includes a first region in which a film deposition condition is satisfied, and a second region in which said film deposition condition is not satisfied, and support means for supporting a substrate in said first region of said furnace, said method comprising the steps of:
   guiding a laser beam to said second region along an optical guide that extends to said second region in order to irradiate the surface of said substrate, and receiving, at said optical guide in said second region, the laser beam that has been reflected by said substrate; and
   detecting the strength of said reflected laser beam received at said optical guide whereby, based on said strength of said reflected laser beam, a change in the thickness of a film is observed while said film is being deposited on said surface of said substrate.

5. A chemical vapor deposition apparatus comprising:
   a quartz furnace for defining an inner space including a film deposition region;
   means attached to said quartz furnace for inserting and removing a plurality of wafers relative to said inner space and for shielding said inner space from an outer space;

means for supporting said plurality of wafers in said film deposition region of said inner space;

a rotary shaft coupled with said support means for transmitting a rotational force originating from said outer space of said quartz furnace;

means for heating said film deposition region;

means for optically guiding a laser beam, wherein said laser beam does not pass through a wall of said quartz furnace, said beam being introduced into said inner space of said furnace to irradiate at least one of said wafers, and along which said laser beam reflected from at least one of said wafers travels without passing through said wall of said quartz furnace; and means for optically generating said laser beam projected along said optically guiding means and for receiving said reflected laser beam travelling along said optically guiding means in order to detect the strength of said reflected laser beam wherein, based on the strength of said reflected laser beam, a change in thickness of a film is monitored in-situ, while said film is deposited on a surface of said at least one wafer.

6. The chemical vapor deposition apparatus according to claim 5, wherein said optically guiding means is extended through the wall of said means for inserting and removing a plurality of wafers in order to channel said laser beam into said inner space in said quartz furnace and to receive said reflected laser beam.

7. The chemical vapor deposition apparatus according to claim 5, wherein said optically guiding means of said laser beam is built within said rotary shaft.

8. The chemical vapor deposition apparatus according to claim 5, wherein a hollow portion of said rotary shaft serves as an optical guide.

9. The chemical vapor deposition apparatus according to claim 7, wherein said rotary shaft through which an optical fiber passes acts as an optical guide.

10. The chemical vapor deposition apparatus according to claim 8, wherein one part of said hollow portion in said rotary shaft is filled with transparent material to inhibit air movement between said inner space and said outer space.

11. The chemical vapor deposition apparatus according to claim 5, wherein said support means hold said plurality of said wafers mounted at intervals, wherein said surfaces of said wafers are substantially perpendicular to the axial direction of said rotary shaft.

12. The chemical vapor deposition apparatus according to claim 11, wherein said support means further hold a plurality of dummy wafers mounted on either side of a plurality of product wafers.

13. The chemical vapor deposition apparatus according to claim 12, wherein one of said product wafers that is nearest to said rotary shaft serves as a wafer for monitoring of a film thickness, and wherein an opening is formed in each of said dummy wafers that is placed along an optical path extending to said monitor wafer.

14. The chemical vapor deposition apparatus according to claim 5, wherein said optical generating means includes an He-Ne laser beam source coupled to said optical guiding means, and a light detector for detecting the strength of said reflected laser beam.

15. The chemical vapor deposition apparatus according to claim 14, wherein said optical generating means includes a half-wavelength plate for converting said incident laser beam into S polarized light, a quarter-wavelength plate for converting said reflected laser beam into P polarized light, and a polarized beam splitter for fully reflecting said S polarized light and for fully transmitting said P polarized light.

16. The chemical vapor deposition apparatus according to claim 15, wherein the strength of said reflected laser beam detected by said optical generating means is transmitted to a controller which monitors, based on a deposition period, a change in thickness of said film on said surface of said substrate.

17. The chemical vapor deposition apparatus according to claim 16, further comprising a gas valve, wherein said controller closes said gas valve when said monitored film attains a predetermined thickness.

18. The chemical vapor deposition apparatus according to claim 5, wherein said laser beam is externally generated.

* * * * *